United States Patent [19]
Henderson et al.

[11] Patent Number: 5,990,582
[45] Date of Patent: *Nov. 23, 1999

[54] COMPUTER FAN SPEED CONTROL DEVICE

[75] Inventors: Michael G. Henderson, San Jose; Carlton G. Amdahl; Dennis H. Smith, both of Fremont, all of Calif.

[73] Assignee: Micron Electronics, Inc., Nampa, Id.

[*] Notice: This patent is subject to a terminal disclaimer.

[21] Appl. No.: 08/942,447

[22] Filed: Oct. 1, 1997

Related U.S. Application Data

[60] Provisional application No. 60/047,016, May 13, 1997, provisional application No. 60/046,416, May 13, 1997, provisional application No. 60/047,003, May 13, 1997, provisional application No. 60/046,490, May 13, 1997, provisional application No. 60/046,398, May 13, 1997, and provisional application No. 60/046,312, May 13, 1997.

[51] Int. Cl.$^6$ .................................................. H05K 7/20
[52] U.S. Cl. ........................ 307/139; 307/130; 388/827; 388/840
[58] Field of Search ...................... 307/116, 126, 307/130; 388/823, 840, 841; 236/DIG. 9

[56] References Cited

U.S. PATENT DOCUMENTS

| | | | |
|---|---|---|---|
| 3,345,551 | 10/1967 | Salvin et al. ............................. | 388/839 |
| 3,940,671 | 2/1976 | Koci ........................................ | 388/839 |
| 4,296,363 | 10/1981 | Blake et al. ............................. | 318/349 |
| 4,449,182 | 5/1984 | Rubinson et al. . | |
| 4,465,958 | 8/1984 | Roberts ................................... | 318/347 |
| 4,751,440 | 6/1988 | Dang ....................................... | 318/370 |
| 4,835,737 | 5/1989 | Herrig . | |
| 4,949,245 | 8/1990 | Martin et al. . | |
| 4,992,709 | 2/1991 | Griffin .................................... | 388/839 |
| 4,999,787 | 3/1991 | McNally et al. . | |
| 5,210,855 | 5/1993 | Bartol . | |
| 5,269,011 | 12/1993 | Yanai et al. . | |
| 5,272,584 | 12/1993 | Austruy et al. . | |
| 5,317,693 | 5/1994 | Cuenod et al. . | |
| 5,329,625 | 7/1994 | Kannan et al. . | |
| 5,337,413 | 8/1994 | Liu et al. . | |
| 5,386,567 | 1/1995 | Lien et al. . | |
| 5,483,419 | 1/1996 | Kaczeus et al. . | |
| 5,493,574 | 2/1996 | McKinley . | |
| 5,493,666 | 2/1996 | Fitch . | |
| 5,517,646 | 5/1996 | Piccirillo et al. . | |
| 5,528,721 | 6/1996 | Searcy, II et al. ..................... | 388/824 |
| 5,555,510 | 9/1996 | Verseput et al. . | |
| 5,564,024 | 10/1996 | Pemberton . | |
| 5,568,610 | 10/1996 | Brown . | |
| 5,577,155 | 11/1996 | Buchbinder ............................ | 388/839 |

(List continued on next page.)

*Primary Examiner*—Albert W. Paladini
*Attorney, Agent, or Firm*—Knobbe, Martens, Olson & Bear, LLP

[57] ABSTRACT

A cooling system for cooling components of a computer is provided. The cooling system includes a DC fan which operates at a speed which is substantially proportional to the voltage that is applied to the fan. A zener diode voltage divider is connected in series between a voltage source and a first input of the fan. The second input of the fan is connected to a reference voltage source. A switch is also connected in series between the voltage source and the first voltage input of the fan so as to be connected in parallel with the zener diode voltage divider. When the switch is in a first position, the voltage produced by the voltage source is applied directly to the fan allowing the fan to operate at a first speed. When the switch is in a second position, the voltage from the voltage source is applied to the first input of the fan through the zener diode such that the first input of the fan receives a second voltage that is less than the first voltage thereby causing the fan to operate at a second speed. The zener diode voltage divider is substantially current independent such that the voltage drop across the zener diode is substantially independent of the current that is drawn by the fan.

19 Claims, 5 Drawing Sheets

U.S. PATENT DOCUMENTS

| | | |
|---|---|---|
| 5,579,491 | 11/1996 | Jeffries et al. . |
| 5,581,712 | 12/1996 | Herrman . |
| 5,588,144 | 12/1996 | Inoue et al. . |
| 5,606,672 | 2/1997 | Wade . |
| 5,608,876 | 3/1997 | Cohen et al. . |
| 5,615,207 | 3/1997 | Gephardt et al. . |
| 5,632,021 | 5/1997 | Jennings et al. . |
| 5,638,289 | 6/1997 | Yamada et al. . |
| 5,644,470 | 7/1997 | Benedict et al. . |
| 5,644,731 | 7/1997 | Liencres et al. . |
| 5,651,006 | 7/1997 | Fujino et al. . |
| 5,652,832 | 7/1997 | Kane et al. . |
| 5,664,119 | 9/1997 | Jeffries et al. . |
| 5,680,288 | 10/1997 | Carey et al. . |
| 5,687,079 | 11/1997 | Bauer et al. ............................ 364/175 |
| 5,696,970 | 12/1997 | Sandage et al. . |
| 5,726,506 | 3/1998 | Wood . |
| 5,740,378 | 4/1998 | Rehl et al. . |
| 5,747,889 | 5/1998 | Raynham et al. . |
| 5,748,426 | 5/1998 | Bendingfield et al. . |
| 5,754,797 | 5/1998 | Takahashi . |
| 5,761,033 | 6/1998 | Wilhelm . |
| 5,761,045 | 6/1998 | Olson et al. . |
| 5,764,968 | 6/1998 | Ninomiya . |
| 5,765,198 | 6/1998 | McCrocklin et al. . |
| 5,768,541 | 6/1998 | Pan-Ratzlaff . |
| 5,768,542 | 6/1998 | Enstrom et al. . |
| 5,781,767 | 7/1998 | Inoue et al. . |
| 5,781,798 | 7/1998 | Beatty et al. . |
| 5,784,576 | 7/1998 | Guthrie et al. . |
| 5,790,831 | 8/1998 | Lin et al. . |
| 5,793,987 | 8/1998 | Quackenbush et al. . |
| 5,794,035 | 8/1998 | Golub et al. . |
| 5,796,185 | 8/1998 | Takata et al. . |
| 5,796,981 | 8/1998 | Abudayyeh et al. . |
| 5,798,828 | 8/1998 | Thomas et al. . |
| 5,799,036 | 8/1998 | Staples . |
| 5,802,269 | 9/1998 | Poisner et al. . |
| 5,802,393 | 9/1998 | Begun et al. . |
| 5,802,552 | 9/1998 | Fandrich et al. . |
| 5,805,834 | 9/1998 | McKinley et al. . |
| 5,809,224 | 9/1998 | Schultz et al. . |
| 5,812,757 | 9/1998 | Okamoto et al. . |
| 5,812,858 | 9/1998 | Nookala et al. . |
| 5,815,117 | 9/1998 | Kolanek . |
| 5,822,547 | 10/1998 | Boesch et al. . |

COMPUTER FAN SPEED CONTROL DEVICE

RELATED APPLICATIONS

The subject matter of U.S. Patent Application entitled "COMPUTER FAN SPEED CONTROL METHOD," filed on Oct. 1, 1997, application Ser. No. 08/942,216, and having attorney Docket No. MNFRAME.017A is related to this application.

PRIORITY CLAIM

The benefit under 35 U.S.C. § 119(e) of the following U.S. provisional application(s) is hereby claimed:

| Title | Application No. | Filing Date |
|---|---|---|
| "Hardware and Software Architecture for Inter-Connecting an Environmental Management System with a Remote Interface" | 60/047,016 | May 13, 1997 |
| "Self Management Protocol for a Fly-By-Wire Service Processor" | 60/046,416 | May 13, 1997 |
| "Isolated Interrupt Structure for Input/Output Architecture" | 60/047,003 | May 13, 1997 |
| "Three Bus Server Architecture with a Legacy PCI Bus and Mirrored I/O PCI Buses" | 60/046,490 | May 13, 1997 |
| "Computer System Hardware Infrastructure for Hot Plugging Single and Multi-Function PC Cards Without Embedded Bridges" | 60/046,398 | May 13, 1997 |
| "Computer System Hardware Infrastructure for Hot Plugging Multi-Function PCI Cards With Embedded Bridges" | 60/046,312 | May 13, 1997 |

APPENDICES

Appendix A, which forms a part of this disclosure, is a list of commonly owned copending U.S. patent applications. Each one of the applications listed in Appendix A is hereby incorporated herein in its entirety by reference thereto.

COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The invention relates to computer equipment and, in particular, relates to a system and a method for sensing and controlling the speed of one or more cooling fans used to cool personal computers.

2. Description of the Related Art

As personal computers have become increasingly sophisticated, there has been an increased need for cooling devices which will remove ambient heat from the air surrounding the electronic components, of the personal computer. Specifically, as personal computers have become increasingly sophisticated, these computers are using increased numbers of electronic components each of which produce greater amounts of heat. This heat can result in damage to components within the chassis or casing of the personal computer or can also result in a decrease in the longevity of the electronic components.

Therefore, it is desirable to reduce the amount of ambient heat in and around the electronic components comprising the personal computer. Various devices are used to reduce or remove the heat. For example, heat sinks are often attached to heat generating electronic components, such as microprocessors, and fans are also used for forced air cooling of the electronic components. Specifically, fans are used to blow air over the heat generating electronic components and also to blow the accumulated hot air away from the atmosphere surrounding the components to thereby lower the air temperature and allow for more heat to be radiated out of the component.

Generally, it is desirable to operate the fans at the lowest speed possible that still provides adequate cooling. Slower speed of operation prolongs the longevity of the fan and also decreases the noise generated by the personal computer. In some applications, there can be as many fans simultaneously operating to cool the computer. At high speed operation, the noise generated by these fans would be distracting to the computer user. Hence, there is a desire to use fans that operate at lower speeds and still provide adequate cooling.

Moreover, in many personal computers, a plurality of fans are used to cool the chassis section of the personal computer. Generally, the number of fans is selected to provide a desired amount of forced air cooling with some redundancy. The redundancy is provided so that if one or more of the fans fail, adequate cooling can still be provided by the remaining fans. This redundancy, however, increases the overall cost of the computer as more fans are installed than are actually needed for normal cooling operations. Further, it will be appreciated that when all of the fans are operating, the fans are generating an increased amount of noise.

Many personal computers are also equipped with dual or multi-speed DC fans that operate at different speeds depending upon the ambient conditions within the personal computer. This allows a controller to select the speed for the fans that provide the optimum cooling without using excessive power or causing excessive wear on the fans. Unfortunately, these multi-speed fans are more expensive and increase the overall cost of the personal computer. In the highly competitive market of personal computers, a small increase in the component cost can result in a significant effect on the overall profitability of the sale of the personal computer. Consequently, it is desirable to be able to use the least expensive components that are capable of performing the necessary functions.

Moreover, while multi-speed fans are currently available for use with personal computers, if one of these fans fail, the prior art personal computers are often unable to detect the failure and to take corrective action. While multi-speed fans can be used to provide varying cooling capacity within the personal computer chassis, these systems are not generally capable of accommodating a failure of one or more of the fans. Hence, the multi-speed fans are also generally selected so as to provide more cooling capacity than is actually required to account for the subsequent loss of one or more fans. This of course causes greater power drain on the power supply, results in noisier computers and also decreases the longevity of the fans themselves.

Hence, there is a need for an inexpensive cooling fan system which is capable of adequately cooling a personal computer. To this end, there is a need for a cooling fan system which can operate at different speeds to provide varying cooling capacity that is less expensive and simpler in construction than systems that have been previously available. There is also a need for an inexpensive cooling fan system for a computer that is capable of determining when one or more of the fans in the cooling fan system has failed and then of inducing other fans to increase their speed to account for the loss of the one or more fans.

SUMMARY OF THE INVENTION

One embodiment of the invention includes a cooling apparatus for a computer that comprises a first voltage source providing a first voltage, a reference voltage source providing a reference voltage, a fan having a first input and a second input which is adapted to be mounted in a computer so as to be able to blow air over components in the computer wherein the fan operates at a speed that is related to the voltage that is applied during the first and second inputs on the fan. This apparatus may also include a voltage divider connected to the first voltage source and the positive input of the fan wherein the second input of the fan is connected to the reference voltage source. Further, a switch may be connected between the first input of the fan so that when the switch is in a first position, the fan receives a first input voltage that operates a first speed and when the switch is in a second position, the fan is connected to the first voltage source via the voltage divider such that the fan receives a second input voltage and operates a second speed wherein the second input voltage and the second speed have a lesser magnitude than the first input voltage and the first speed.

Another embodiment of the present invention, includes a current independent voltage divider such that the reduction in magnitude between the first input voltage and the second input voltage is substantially independent of the current that is drawn by the fan. In another embodiment of the invention, the voltage divider is comprised of a zener diode that is positioned in series between the first voltage source and the first input of the fan. In another embodiment the switch is comprised of an open collector gate, P-channel MOSFET that is connected in series between the first voltage source and the first input of the fan so as to be positioned in parallel with the voltage divider.

In another embodiment of the invention, a cooling apparatus for a computer is provided. The cooling apparatus includes a voltage source which provides a first voltage, a fan having an input that is adapted to be mounted in a computer wherein the fan operates at a speed that is related to the voltage that is received by the fan, a current independent voltage divider that is connected to the voltage source and to the input of the fan wherein the voltage provided to the input of the fan from the current independent voltage divider is a first input voltage substantially regardless of the current drawn by the fan, and a switch connected to the fan and the voltage source so that when the switch is in a first position, the fan receives the first input voltage and operates at a first speed and when the switch is in a second position the fan receives a second input voltage and operates at a second speed wherein the first speed is less than the second speed. In one embodiment, the current independent voltage divider is comprised of a zener diode that is positioned in series between the voltage source and the first input of the fan. In another embodiment the switch is connected in series between the voltage source and the input of the fan so as to be positioned in parallel with the voltage divider.

In yet another embodiment of the invention, a cooling apparatus for a computer is provided which comprises a voltage source providing a first voltage, a fan having an input that is adapted to be mounted in a computer wherein the fan operates at a speed that is related to the voltage that is received by the fan, a zener diode divider that is connected to the voltage source and to the input of the fan wherein the voltage provided to the input of the fan is a first input voltage substantially regardless of the current drawn by the fan, and a switch connected to the fan and the voltage source so that when the switch is in a first position, the fan receives the first input voltage and operates at a first speed and when the switch is in a second position the fan receives a second input voltage and operates at a second speed, wherein the first speed is less than the second speed. In one embodiment the switch is connected in series between the first voltage source and the input of the fan so as to be positioned in parallel with the voltage divider.

In another embodiment of the invention, a cooling apparatus for a computer is provided which comprises a first voltage source providing a first voltage, a reference voltage source providing a reference voltage, a fan having a first input and a second input which is adapted to be mounted in a computer so as to be able to blow air inside the computer wherein the fan operates at a speed that is proportional to the voltage that is applied between the first and second inputs on the fan, a zener diode voltage divider connected to the first voltage source and to the first input of the fan wherein the second input of the fan is connected to the reference voltage source, and a switch connected to the first input of the fan and the first voltage source so as to be connected in parallel with the zener diode voltage dividers so that when the switch closes, the switch directly applies the first voltage to the first input of the fan and when the switch is open the first input of the fan receives a second voltage that is less than the first voltage from the zener diode voltage divider such that the speed of operation of the fan upon receiving the second voltage is less than the speed of operation of the fan receiving the first voltage.

It will be appreciated that some embodiments of the invention provide a cooling system which allows for less expensive fans to operate at two separate speeds. The cooling system may incorporate a circuit which is substantially independent of the current that is drawn by the fan thereby allowing a plurality of different fans to be used without requiring the circuit to be redesigned.

DETAILED DESCRIPTION OF THE INVENTION

Figure 1:
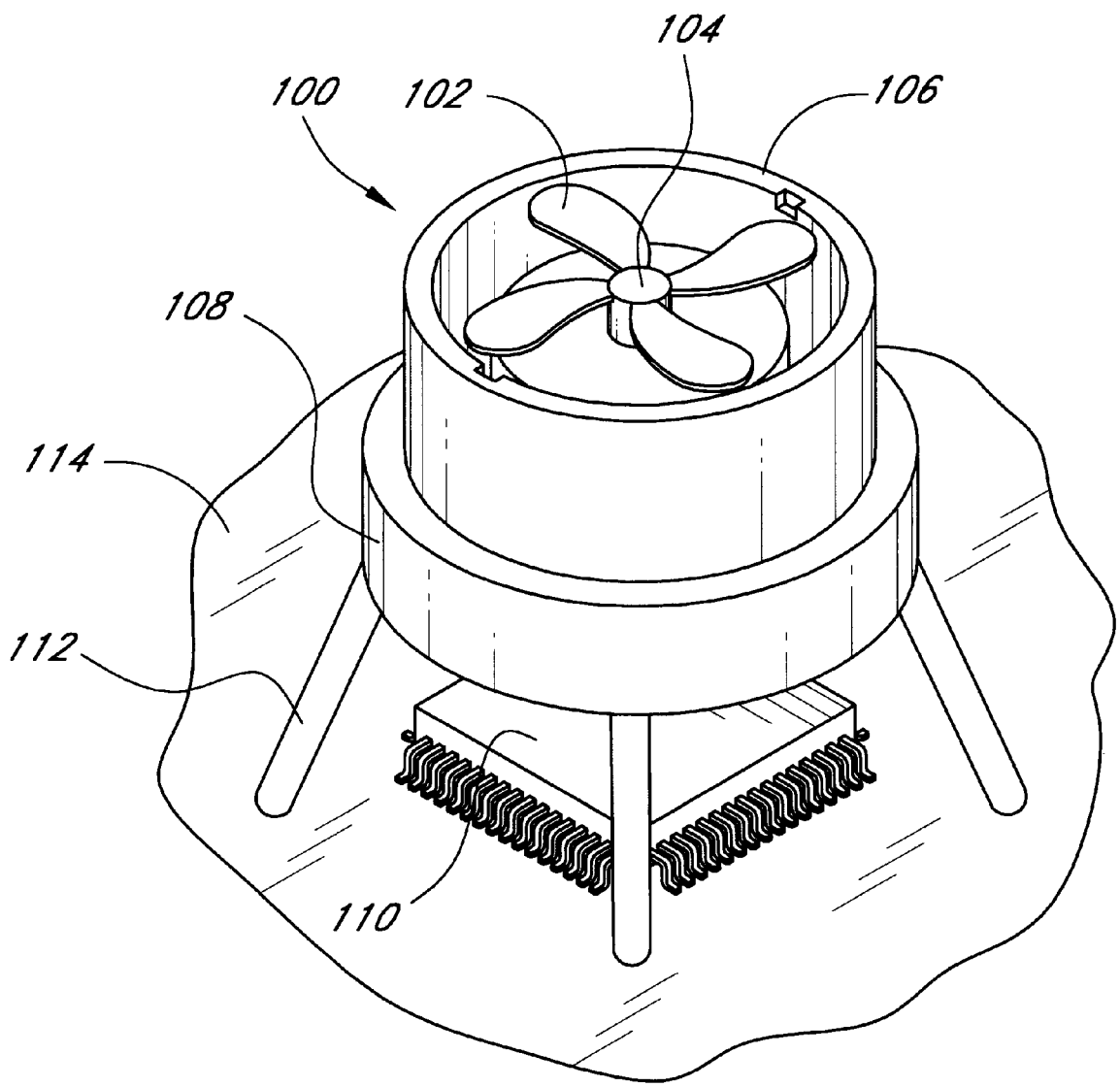
FIG. 1 is a perspective view of one exemplary cooling fan mounted adjacent an electrical component of a personal computer.

Reference will now be made to the drawings wherein like numerals refer to like parts throughout. FIG. 1 illustrates a typical cooling fan assembly 100 used in one embodiment of the invention. In particular, the cooling fan assembly 100 includes a fan 101 that has a fan blade 102 that is mounted about a shaft 104 so as to be positioned within a housing 106. The housing 106 is attached to a mount 108 that is mounted in the personal computer so that the fan blades 102 can cool an electrical component 110.

In the embodiment shown in FIG. 1, the cooling fan assembly 100 is mounted on posts 112 that are attached to a printed circuit board 114 so that the cooling fan blades 102 blow cool air over an integrated circuit 110 that is mounted on the printed circuit board 114. In this manner, the operation of the fan assembly 100 reduces the ambient temperature surrounding the integrated circuit 110 and thereby dissipates the heat that is produced by the integrated circuit 110. It will be appreciated, however, that the fan 101 may be mounted in any of a number of well-known manners without departing from the spirit of the invention. For example, the fan may also be mounted in a sidewall of a chassis of the computer so as to allow the fan to draw cool air into the chassis from the outside environment or to expel hot air from the chassis to the cooler outside environment.

A control circuit 120 (FIG. 2) is used to control the operation of the fan assembly 100 in a manner that will be described below. In one embodiment, the fan assembly 100 includes a DC fan 101 such as a Model FBA09Ap12M single speed fan manufactured by Panasonic. It will be appreciated from the following discussion that the control circuit 120 of this embodiment can be used in conjunction with DC fan assemblies such as single speed fans that are mounted in any of a number of well-known manners within the chassis of a personal computer or any other electronic device requiring forced air cooling.

Figure 2:
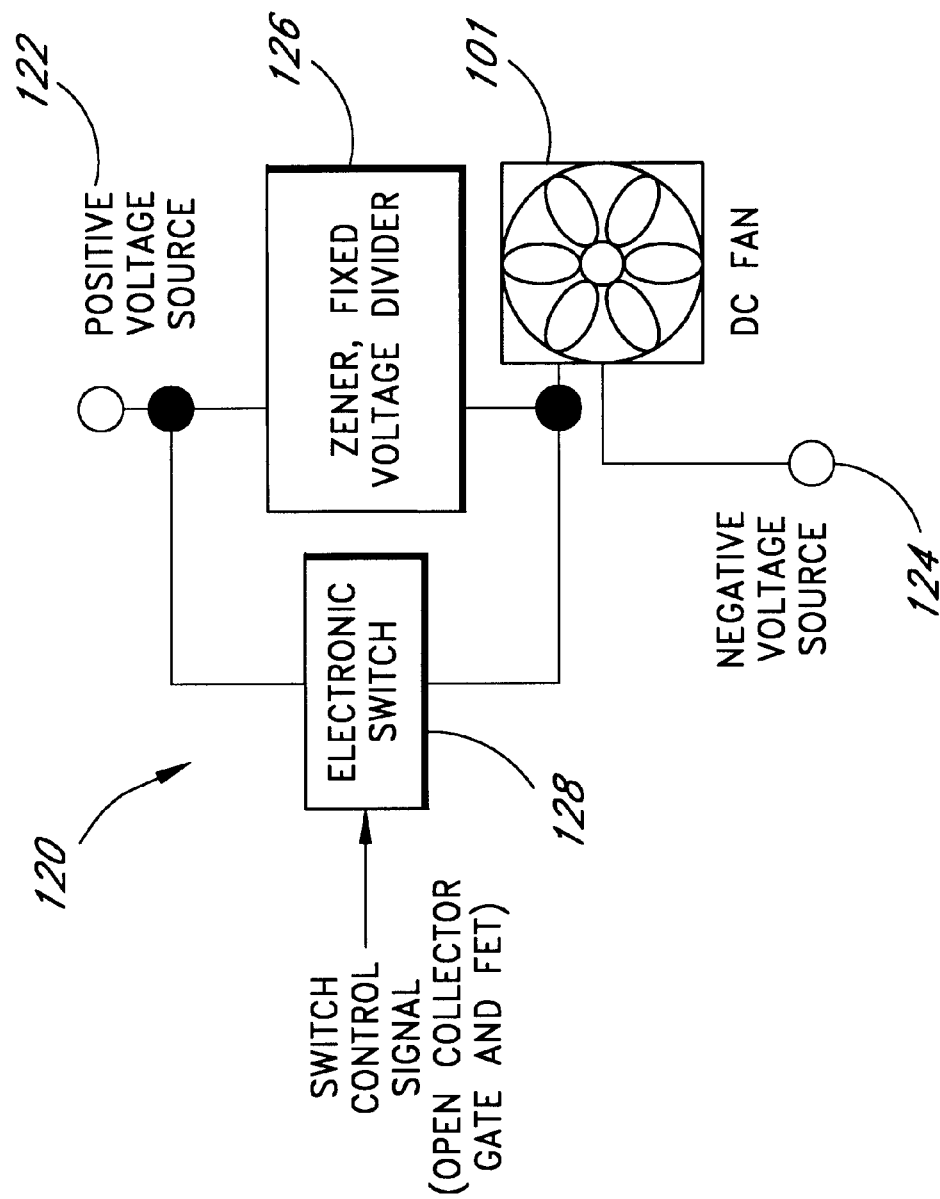
FIG. 2 is a block diagram illustrating one embodiment of a control circuit for a single speed DC fan.

Referring now to FIG. 2, the control circuit 120 is described in greater detail. Specifically, the DC fan 101 is electrically connected between a positive voltage source 122 and a negative voltage source 124. A zener fixed voltage divider 126 is connected in series between the DC fan 100 and the positive voltage source 122. Similarly, an electronic switch 128 is also connected in series between the DC fan 101 and the positive voltage source 122 so that the electronic switch 128 is connected in parallel with the zener fixed voltage divider 126.

The control circuit 120 operates as follows. The DC fan 101 receives the full differential between the positive voltage source 122 and the negative voltage source 124 when the electronic switch 128 is closed. Alternatively, the DC fan 101 sees a smaller applied voltage when the electronic switch 128 is opened and the voltage is applied across the zener fixed voltage divider 126. As is understood in the art, a zener fixed voltage divider 126 reduces the voltage that is applied across the DC fan by a known amount, $V_Z$. Hence, by opening the electronic switch 128, a reduced voltage can be applied across the DC fan 101 which thereby results in the fan 101 operating at a slower speed and producing less noise.

Advantageously, the voltage drop $V_Z$ across the zener fixed voltage divider is generally independent of the current that is being drawn by the fan 101. Specifically, different fans from different manufacturers will draw different amounts of current. If a resistor network were used to produce the voltage drop for low speed operation of the fan, the resistor network would have to be tailored for each manufacturer's fans. Using a zener diode based voltage divider results in substantially the same voltage drop occurring regardless of the current that is being drawn by the fan 101.

Figure 3:
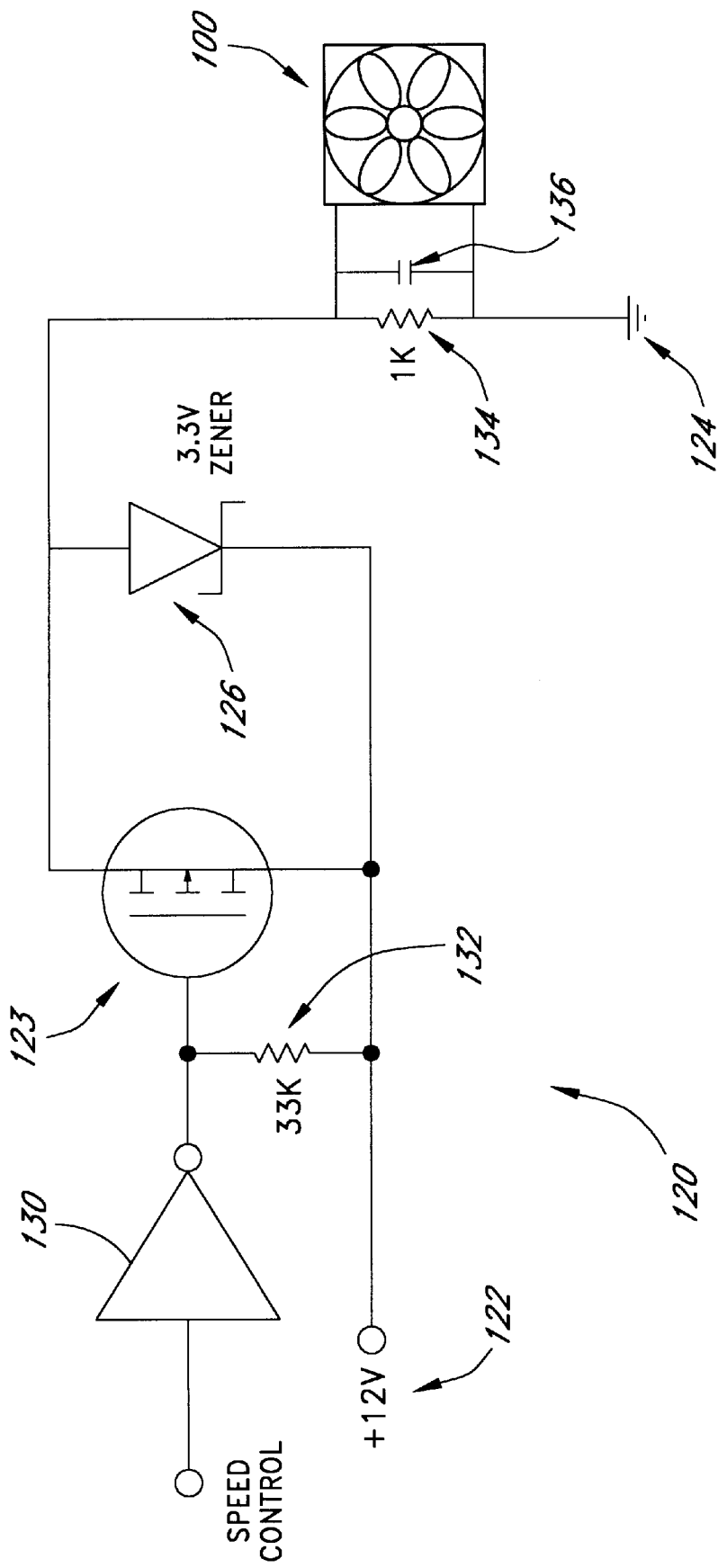
FIG. 3 is an electrical schematic illustrating the control circuit of FIG. 2 in greater detail.

FIG. 3 is an electrical schematic which illustrates one embodiment of the fan control circuit 120 in greater detail.

In particular, as shown in FIG. 3, the electronic switch 128 in this embodiment is comprised of an open collector gate, P-channel MOSFET. The MOSFET switch 128 receives a speed control signal from a speed control circuit (not shown) through a gate 130. The speed control signal can be a control signal that is provided by a processor of the personal computer. In that embodiment, the processor would typically receive a signal from a tachometer associated with the fan and use this signal to adjust the speed of the fan to optimize the fan performance. Alternatively, one embodiment of a control system that can be used in conjunction with the fan speed control circuit 120 will be described in greater detail in reference to FIGS. 4–6 below. This embodiment of a control system senses the speed of one of a plurality of fans and then induces other fans within the system to operate at higher speeds upon sensing that a fan is no longer operating in a desired manner.

Hence, the speed control signal can be used to enable or disable the MOSFET switch 128. When the MOSFET switch 128 is enabled, the 12 volts DC power from the power supply is applied across a biasing resistor 134 such as a 1 Kohm resistor that is positioned in parallel with the fan 101. When the MOSFET switch 128 is enabled, the fan 101 effectively sees the entire 12 volts DC from the power supply across its input and output. This results in the fan 101 operating at a higher speed. Hence, in this configuration, the fan 101 provides greater cooling capacity at a cost of increased power consumption by the fan assembly 101, greater wear on the fan 101 and more noise. A noise filtering capacitor 136 may also be connected in parallel to the biasing resistor 134 and the positive and negative inputs of the fan assembly 100 in a well known manner.

Alternatively, the speed control signal can be used to open the MOSFET switch 128 so that the fan assembly 100 only sees 8.7 volts DC which results in the fan 101 operating at a slower speed. As is understood in the art, once 3.3 volts are applied across the zener diode 126, the zener diode experiences zener breakdown which effectively results in the zener diode operating as a low resistance conductor while reducing the voltage that is applied across the fan 101 to 8.7 volts.

Consequently, the control circuitry 120 is capable of operating a single speed DC fan 101 at a low speed by applying only 8.7 volts DC to the fan, thereby causing the fan 101 to spin at a slower speed and thereby prolonging the life of the fan and decreasing the noise produced by the fan. Alternatively, the control circuit 120 can also be configured so as to apply 12 volts DC to thereby operate the fan 101 at a higher speed which will result in more cooling of the computer components.

The circuit 120 of this embodiment also includes a biasing resistor 132 such as a 33 Kohm resistor which is selected so that when the speed control input signal is to turn the gate 128 off, the gate is open and the resistor 132 between the gate of the MOSFET 128 and the source of the MOSFET 128 biases the MOSFET in the off condition. However, when the speed control input is such as to bias the MOSFET 128 to turn on, the gate pin of the MOSFET 128 is pulled to ground giving the 12 volts across the gate-source junction and thereby turning the MOSFET switch on and shorting across the zener diode 126.

It will be appreciated from the foregoing that this embodiment of the control circuit is capable of being used in conjunction with a DC fan so as to operate the DC fan 101 at a variety of speeds. The control circuit 120 can therefore be used to increase or decrease the speed of the fan 101 as required to achieve the desired cooling effect of the components while reducing the wear and tear on the fans and the noise produced by the fans. Moreover, it will be appreciated that the use of the zener diode will allow the circuit 120 to be used with a plurality of different fans from different manufacturers while still providing the same voltage differential between low speed and high speed operation regardless of the current drawn by the fan.

Figure 4:
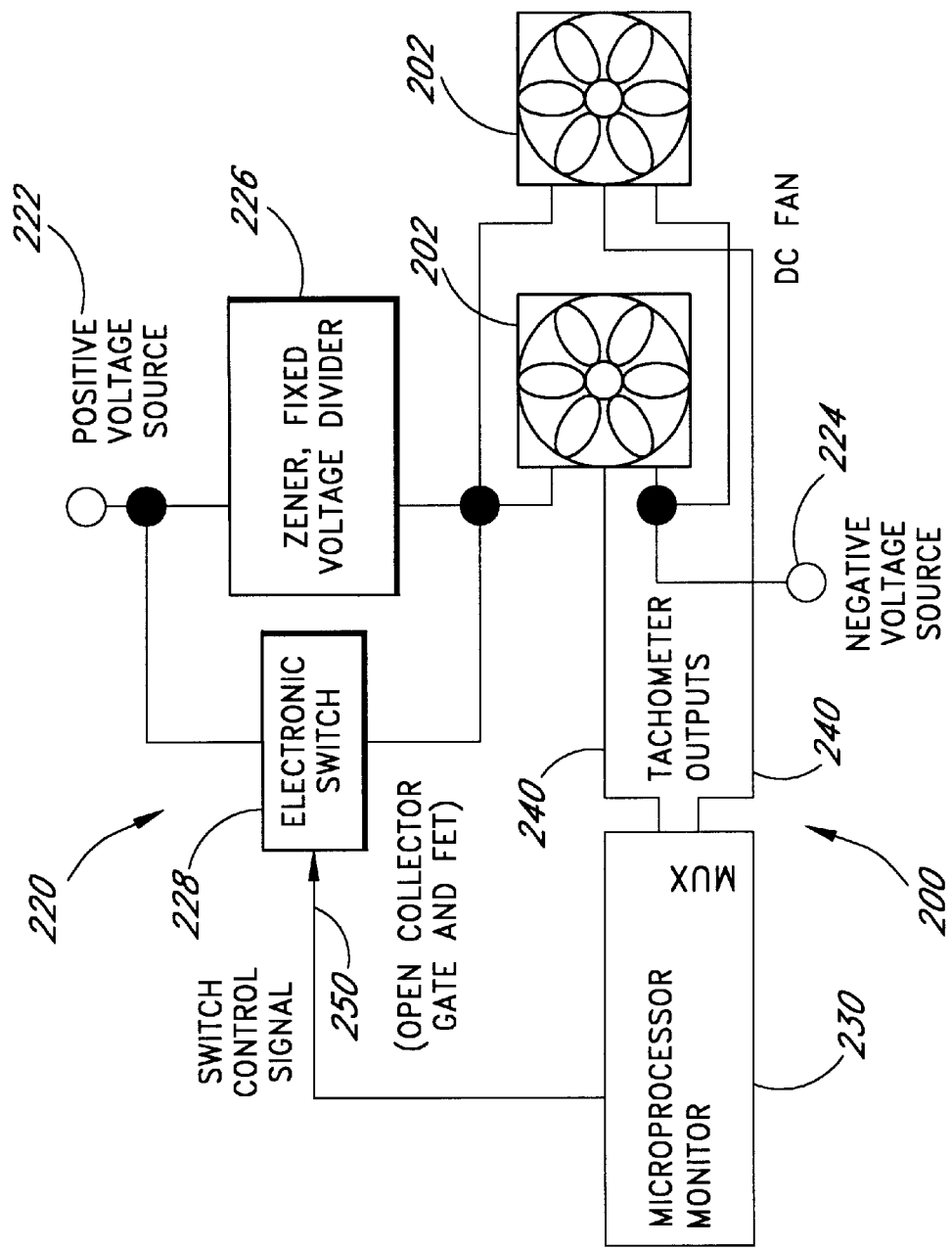
FIG. 4 is a block diagram illustrating one embodiment of a cooling system for a personal computer that incorporates a control system for controlling a plurality of fans used to cool a computer.

FIG. 4 is a block diagram which illustrates another implementation of a control circuit 220 which is similar to the control circuit 120 described above in reference to FIGS. 2 and 3. Specifically, in FIG. 4, the control circuit 220 is adapted to control the speed of a plurality of DC fans 202 which are substantially similar to the fan 101 described above. The control circuit 220 includes an electronic switch 228 similar to the electronic switch 128 that is described above. The electronic switch 228 is connected in series with the fans 202 which are connected in parallel. The electronic switch 228 is also connected in parallel to a zener fixed voltage divider 226 similar to the voltage divider 126 described above.

The control circuit 220 also includes a microprocessor 230 which receives signals from tachometer outputs 240 that are attached to each of the fans 202. In normal operation, the fans 202 see a lower DC voltage as a result of the zener voltage divider 226 being in series with the fans 202. When the tachometer outputs 240 indicate that one of the fans 202 has slowed down, the microprocessor 230 is adapted to send a control signal along the switch control signal line 250 to the electronic switch 228. The electronic switch 228 then shorts out a zener fixed voltage divider 226. This results in the full voltage differential between a positive voltage source 222 and a negative voltage source 224 being applied across the inputs to the fans 202 in the manner that was described above.

As will be described in greater detail below, the control system 200 is adapted to determine when one of a plurality of fans 202 is no longer operating such that the cooling system 200 is no longer providing adequate cooling to the computer. At which point, the microprocessor 230 provides a signal on the switch control signal line 250 to enable the electronic switch 228. This results in the zener fixed voltage divider 226 being shorted out and a greater voltage being applied to the DC fans 202. This results in the DC fans 202 that are continuing to operate to increase their speed of rotation, thereby increasing their cooling capacity. In one embodiment, the microprocessor 230 continues to monitor the tachometer output 240 of the plurality of fans 202 such that when the fan that is operating incorrectly comes back on line, the microprocessor monitor then sends a signal along the switch control signal line 250 to the electronic switch 228 which opens the electronic switch 228. In this case, the voltage that is applied to the DC fan 202 is lowered as a result of these zener fixed voltage divider 226 being positioned in series with the fans. This will result in the fans 202 operating at a slower speed, thereby decreasing the wear and tear on the fans and the noise produced by the fans.

Hence, the control system 200 is capable of monitoring the speed of rotation of a number of fans when the fans were operating at a first speed. When the microprocessor 230 determines that one of the fans is no longer operating, the microprocessor can then increase the voltage to the remaining operating fans to thereby increase the speed of operation of the remaining fans 202 and to thereby increase the cooling capacity provided by these fans. Consequently, the control system 200 is capable of correcting a situation where the failure of one or more of the fans would result in too little cooling capacity being provided by the remaining fans.

Figure 5:
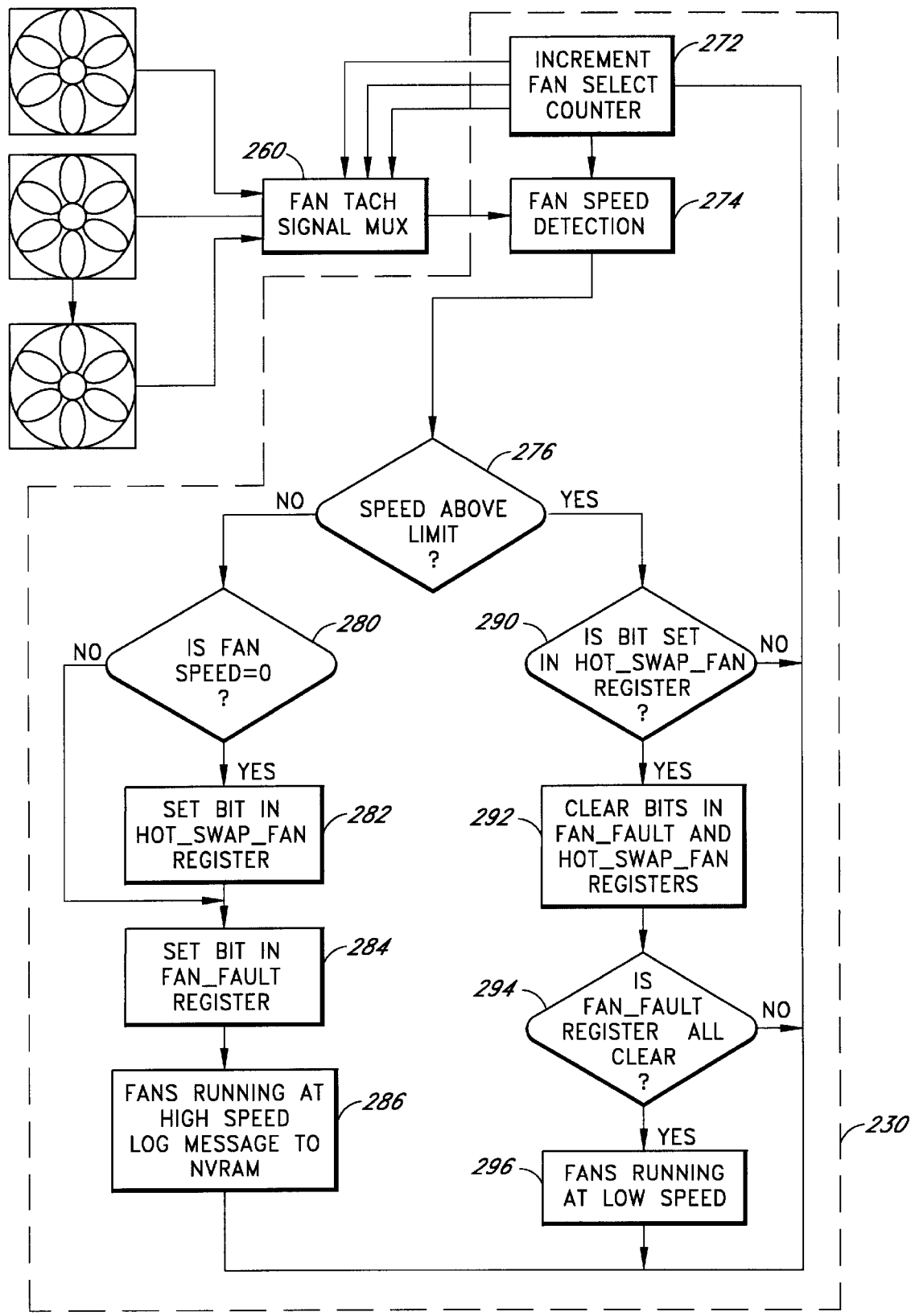
FIG. 5 is a block diagram and flow chart illustrating the operation of the control system for controlling a plurality of fans used to cool a computer.

FIG. 5 is a block diagram which illustrates the operation and configuration of the control system 200 in greater detail. In particular, the tachometer outputs of each of the fans 202 are provided to a multiplexer 260. In one embodiment, the fans 202 include intrinsic tachometers. In another embodiment, an external sensor is used with a simpler fan, in the manner described below in reference to FIG. 6, to provide a tachometer output to the multiplexer 260. The multiplexer 260 is under the control of the microprocessor 230 in the sense that the microprocessor 230 can, in a state 272, induce the multiplexer 260 to sample each of the tachometer outputs 240 from the fans 202.

Specifically, once the microprocessor 230 has induced the multiplexer 260 to sample a particular tachometer output 240 from a particular fan 202, the tachometer output is provided to the microprocessor 230 such that the microprocessor 230, in a state 274, can sense the speed of the fan 202. The speed of the fan 202 is directly proportional to the cooling capacity that is provided by the fan 202. The microprocessor 230 can then determine, in decision state 276, whether the speed of the fan 202 is above the desired limit.

If the speed of the fan 202 is not above the desired limit, then the fan is not operating correctly and insufficient cooling capacity is being provided to the computer. Consequently, the microprocessor 230 can then determine, in state 280, whether the fan speed is equal to zero based upon the fan speed that was detected in state 274. In this embodiment, if the fan speed detected by the microprocessor 230 in state 274 is equal to zero, this means that the fan is being replaced. As will be described in greater detail below, once the fan is replaced, the voltage applied to the plurality of fans can be lowered to the lower voltage value.

Specifically, if the fan speed is equal to zero, then the microprocessor 230 sets, in state 282, a bit entitled hot__swap__fan register equal to one. This indicates this fan is being replaced. Subsequently, the microprocessor 230 then sets a bit in the fan__fault register, in state 284, corresponding to the fan 202 to one. Setting the bit in the fan__fault register to one results in a high output being provided, in state 286, along the switch control signal line 250 (FIG. 4), thereby closing the switch 228 and shorting out the fixed zener voltage divider 226 causing the remaining fans 202 to operate at the higher speed. Further, in one embodiment, the microprocessor 230 also sends a signal, in state 286, to a non-volatile RAM (not shown) recording that the fan 202 is no longer operating correctly. This allows a maintenance person to identify which fans are not operating correctly for subsequent replacement and/or repair of the incorrectly operating fans 202.

Hence, the microprocessor 230 is capable of evaluating the speed of a particular fan 202 and determining whether it is underspeed. The microprocessor 230 also determines whether the speed is equal to zero or is simply less than the desired speed. The microprocessor 230 also induces a high output to be provided on the switch control signal line 250 to the electronic switch 228 upon sensing that any of the fans 202 is operating at a speed that is less than the desired limit. This results in a greater voltage being applied to the remaining fans 202 thereby increasing the speed of operation of these fans to offset the loss of cooling capacity due to the incorrectly operating fan.

Alternatively, if the microprocessor 230 determines, in decision state 276, that the speed of the fan 202 is above the minimum limit, the processor 230 then determines, in decision state 290, whether the hot__swap__fan register bit has been set for this particular fan 202. If the hot_swap_fan bit has been set, that means that the fan was previously stopped and is now operating correctly which indicates the bad fan 202 has been replaced.

This results in the processor 230 clearing, in state 292, the bits and fan_fault and hot_swap_fan registers corresponding to this particular fan 202. The processor 230 then determines, in decision state 294, whether the fan_fault register is all clear and, if so, the processor 230 then sends a low signal on the switch control signal line 250 to the electronic switch 228 (FIG. 4) to open the electronic switch 228. This results in the fans 202 seeing the lowered voltage as a result of the zener fixed voltage divider 226 being connected in series with the fans 202. This results in all of the fans 202 operating at a lower speed thereby prolonging the life of the fan and also reducing the noise produced by of the operating fans.

Hence, the processor 230 sequentially evaluates the tachometer output lines of each of the fans 202 to determine the speed of the fan 202. If any one of the fans is not operating at the correct speed, the processor 230 then sends a signal to the switch thereby disabling the zener voltage divider 226 and increasing the voltage to the remaining fans 202 to cause these fans 202 to speed up. The processor 230 continues to monitor the speed of operation of each of the fans 202, including any fan that was previously sensed as not operating correctly. If the fans are operating correctly, then the processor 230 opens the switch 228 and positions the voltage divider 226 in series with the DC fans 202 to thereby reduce the voltage that is being applied to the DC fans.

Hence, the foregoing description has described several embodiments of a circuit for controlling the operation of fan which incorporates a zener diode divider that can be selectively switched into series with the power input of a fan to decrease the voltage that is provided to the fan. This allows the fan to operate at a lower speed thereby prolonging the longevity of the fan and also decreasing the noise produced by the fan. In another embodiment, a cooling system is provided which incorporates the zener diode control circuit and a plurality of fans. The cooling system may also include a microprocessor that senses the speed of operation of the plurality of fans and, upon sensing that one or more fans are no longer operating at a desired speed, the microprocessor closes a switch to short out the zener bridge divider so that the remaining fans receive a higher voltage to offset the loss of cooling capacity resulting from the loss of the fan.

Hence, although the foregoing description of the invention has shown, described, and pointed out fundamental novel features of the invention, it will be understood that various omissions, substitutions, and changes in the form of the detail of the apparatus and method as illustrated as well as the uses thereof, may be made by those skilled in the art without departing from the spirit of the invention. Consequently, the scope of the invention should not be limited to the foregoing discussion, but should be defined by the appended claims.

Appendix A
Incorporation by Reference of Commonly Owned Applications

The following patent applications, commonly owned and filed October 1, 1997, are hereby incorporated herein in their entirety by reference thereto:

| Title | Application No. | Attorney Docket No. |
|---|---|---|
| "System Architecture for Remote Access and Control of Environmental Management" | 08/942,160 | MNFRAME.002A1 |
| "Method of Remote Access and Control of Environmental Management" | 08/942,215 | MNFRAME.002A2 |
| "System for Independent Powering of Diagnostic Processes on a Computer System" | 08/942,410 | MNFRAME.002A3 |
| "Method of Independent Powering of Diagnostic Processes on a Computer System" | 08/942,320 | MNFRAME.002A4 |
| "Diagnostic and Managing Distributed Processor System" | 08/942,402 | MNFRAME.005A1 |
| "Method for Managing a Distributed Processor System" | 08/942,448 | MNFRAME.005A2 |
| "System for Mapping Environmental Resources to Memory for Program Access" | 08/942,222 | MNFRAME.005A3 |
| "Method for Mapping Environmental Resources to Memory for Program Access" | 08/942,214 | MNFRAME.005A4 |
| "Hot Add of Devices Software Architecture" | 08/942,309 | MNFRAME.006A1 |
| "Method for The Hot Add of Devices" | 08/942,306 | MNFRAME.006A2 |
| "Hot Swap of Devices Software Architecture" | 08/942,311 | MNFRAME.006A3 |
| "Method for The Hot Swap of Devices" | 08/942,457 | MNFRAME.006A4 |
| "Method for the Hot Add of a Network Adapter on a System Including a Dynamically Loaded Adapter Driver" | 08/943,072 | MNFRAME.006A5 |
| "Method for the Hot Add of a Mass Storage Adapter on a System Including a Statically Loaded Adapter Driver" | 08/942,069 | MNFRAME.006A6 |
| "Method for the Hot Add of a Network Adapter on a System Including a Statically Loaded Adapter Driver" | 08/942,465 | MNFRAME.006A7 |
| "Method for the Hot Add of a Mass Storage Adapter on a System Including a Dynamically Loaded Adapter Driver" | 08/962,963 | MNFRAME.006A8 |
| "Method for the Hot Swap of a Network Adapter on a System Including a Dynamically Loaded Adapter Driver" | 08/943,078 | MNFRAME.006A9 |
| "Method for the Hot Swap of a Mass Storage Adapter on a System Including a Statically Loaded Adapter Driver" | 08/942,336 | MNFRAME.006A10 |
| "Method for the Hot Swap of a Network Adapter on a System Including a Statically Loaded Adapter Driver" | 08/942,459 | MNFRAME.006A11 |
| "Method for the Hot Swap of a Mass Storage Adapter on a System Including a Dynamically Loaded Adapter Driver" | 08/942,458 | MNFRAME.006A12 |
| "Method of Performing an Extensive Diagnostic Test in Conjunction with a BIOS Test Routine" | 08/942,463 | MNFRAME.008A |
| "Apparatus for Performing an Extensive Diagnostic Test in Conjunction with a BIOS Test Routine" | 08/942,163 | MNFRAME.009A |

-continued

Appendix A
Incorporation by Reference of Commonly Owned Applications

The following patent applications, commonly owned and filed October 1, 1997, are hereby incorporated herein in their entirety by reference thereto:

| Title | Application No. | Attorney Docket No. |
|---|---|---|
| "Configuration Management Method for Hot Adding and Hot Replacing Devices" | 08/941,268 | MNFRAME.010A |
| "Configuration Management System for Hot Adding and Hot Replacing Devices" | 08/942,408 | MNFRAME.011A |
| "Apparatus for Interfacing Buses" | 08/942,382 | MNFRAME.012A |
| "Method for Interfacing Buses" | 08/942,413 | MNFRAME.013A |
| "Computer Fan Speed Control Method" | 08/942,216 | MNFRAME.017A |
| "System for Powering Up and Powering Down a Server" | 08/943,076 | MNFRAME.018A |
| "Method of Powering Up and Powering Down a Server" | 08/943,077 | MNFRAME.019A |
| "System for Resetting a Server" | 08/942,333 | MNFRAME.020A |
| "Method of Resetting a Server" | 08/942,405 | MNFRAME.021A |
| "System for Displaying Flight Recorder" | 08/942,070 | MNFRAME.022A |
| "Method of Displaying Flight Recorder" | 08/942,068 | MNFRAME.023A |
| "Synchronous Communication Interface" | 08/943,355 | MNFRAME.024A |
| "Synchronous Communication Emulation" | 08/942,004 | MNFRAME.025A |
| "Software System Facilitating the Replacement or Insertion of Devices in a Computer System" | 08/942,317 | MNFRAME.026A |
| "Method for Facilitating the Replacement or Insertion of Devices in a Computer System" | 08/942,316 | MNFRAME.027A |
| "System Management Graphical User Interface" | 08/943,357 | MNFRAME.028A |
| "Display of System Information" | 08/942,195 | MNFRAME.029A |
| "Data Management System Supporting Hot Plug Operations on a Computer" | 08/942,129 | MNFRAME.030A |
| "Data Management Method Supporting Hot Plug Operations on a Computer" | 08/942,124 | MNFRAME.031A |
| "Alert Configurator and Manager" | 08/942,005 | MNFRAME.032A |
| "Managing Computer System Alerts" | 08/943,356 | MNFRAME.033A |
| "Computer Fan Speed Control System" | 08/940,301 | MNFRAME.034A |
| "Computer Fan Speed Control System Method" | 08/941,267 | MNFRAME.035A |
| "Black Box Recorder for Information System Events" | 08/942,381 | MNFRAME.036A |
| "Method of Recording Information System Events" | 08/942,164 | MNFRAME.037A |
| "Method for Automatically Reporting a System Failure in a Server" | 08/942,168 | MNFRAME.040A |
| "System for Automatically Reporting a System Failure in a Server" | 08/942,384 | MNFRAME.041A |
| "Expansion of PCI Bus Loading Capacity" | 08/942,404 | MNFRAME.042A |
| "Method for Expanding PCI Bus Loading Capacity" | 08/942,223 | MNFRAME.043A |
| "System for Displaying System Status" | 08/942,347 | MNFRAME.044A |
| "Method of Displaying System Status" | 08/942,071 | MNFRAME.045A |
| "Fault Tolerant Computer System" | 08/942,194 | MNFRAME.046A |
| "Method for Hot Swapping of Network Components" | 08/943,044 | MNFRAME.047A |
| "A Method for Communicating a Software Generated Pulse Waveform Between Two Servers in a Network" | 08/942,221 | MNFRAME.048A |
| "A System for Communicating a Software Generated Pulse Waveform Between Two Servers in a Network" | 08/942,409 | MNFRAME.049A |
| "Method for Clustering Software Applications" | 08/942,318 | MNFRAME.050A |
| "System for Clustering Software Applications" | 08/942,411 | MNFRAME.051A |
| "Method for Automatically Configuring a Server after Hot Add of a Device" | 08/942,319 | MNFRAME.052A |
| "System for Automatically Configuring a Server after Hot Add of a Device" | 08/942,331 | MNFRAME.053A |
| "Method of Automatically Configuring and Formatting a Computer System and Installing Software" | 08/942,412 | MNFRAME.054A |
| "System for Automatically Configuring and Formatting a Computer System and Installing Software" | 08/941,955 | MNFRAME.055A |
| "Determining Slot Numbers in a Computer" | 08/942,462 | MNFRAME.056A |
| "System for Detecting Errors in a Network" | 08/942,169 | MNFRAME.058A |
| "Method of Detecting Errors in a Network" | 08/940,302 | MNFRAME.059A |
| "System for Detecting Network Errors" | 08/942,407 | MNFRAME.060A |
| "Method of Detecting Network Errors" | 08/942,573 | MNFRAME.061A |

What is claimed is:

1. A cooling apparatus for a computer comprising:
   a first voltage source providing a first voltage;
   a reference voltage source providing a reference voltage;
   a fan having a first input and a second input wherein the fan operates at a speed that is related to a voltage that is applied between the first and the second inputs on the fan;
   a zener diode voltage divider connected to the first voltage source and to the first input of the fan wherein the second input of the fan is connected to the reference voltage source; and
   a switch having a first position and a second position, the switch being connected to the first input of the fan so that when the switch is in a first position, the fan directly receives a first voltage and operates at a first speed and the zener diode voltage divider is shorted and when the switch is in a second position that fan is connected to the first voltage source via the zener diode voltage divider such that the fan receives a second voltage directly from the zener diode voltage divider and operates at a second speed which is less than the first speed.

2. The cooling apparatus of claim 1, wherein the voltage divider is substantially current independent.

3. The cooling apparatus of claim 1, wherein the first voltage is approximately 12 Volts DC, the reference voltage is 0 volts DC and the change in magnitude between the first input voltage and the second input voltage is approximately 3 volts DC.

4. The cooling apparatus of claim 1, wherein the switch is comprised of an open collector gate, P-channel MOSFET that is connected in series between the first voltage source and the first input of the fan so as to be positioned in parallel with the voltage divider.

5. The cooling apparatus of claim 1, wherein the fan is a two wire DC fan that operates at a speed that is substantially proportional to the input voltage received by the fan.

6. A cooling apparatus for a computer comprising:

a voltage source providing a first voltage;

a fan having an input wherein the fan operates at a speed that is related to the voltage that is received by the fan;

a zener diode voltage divider that is connected to the voltage source and to the input of the fan; and a switch connected to the fan and the voltage source so that when the switch is in a first position, the fan directly receives the first voltage and operates at a first speed and the zener diode voltage divider is shorted out and when the switch is in a second position the fan receives a second voltage directly from the zener diode voltage divider and operates at a second speed, wherein the first speed is less than the second speed.

7. The cooling apparatus of claim 6, wherein the first voltage is approximately 12 Volts DC, the reference voltage is 0 volts DC and the change in magnitude between the first input voltage and the second input voltage is approximately 3 volts DC.

8. The cooling apparatus of claim 6, wherein the switch is connected in series between the voltage source and the input of the fan so as to be positioned in parallel with the voltage divider.

9. The cooling apparatus of claim 8, wherein the switch is comprised of an open collector gate, P-channel MOSFET.

10. The cooling apparatus of claim 9, wherein the fan is a two wire DC fan that operates at a speed that is substantially proportional to the input voltage received by the fan.

11. A cooling apparatus for a computer comprising:

a voltage source providing a first voltage;

a fan having an input which is adapted to be mounted in a computer wherein the fan operates at a speed that is related to the voltage that is received by the fan;

a zener diode divider that is connected to the voltage source and to the input of the fan; and a switch connected to the fan and the voltage source so that when the switch is in a first position, the fan directly receives the first input voltage and operates at a first speed and when the switch is in a second position the fan receives a second input voltage directly from the zener diode divider and operates at a second speed, wherein the first speed is less than the second speed wherein the switch is coupled to the zener diode voltage divider so that only one of the first and second voltages is enabled at one time.

12. The cooling apparatus of claim 11, wherein the first voltage is approximately 12 Volts DC, the reference voltage is 0 volts DC and the change in magnitude between the first input voltage and the second input voltage is approximately 3 volts DC.

13. The cooling apparatus of claim 11, wherein the switch is connected in series between the first voltage source and the input of the fan so as to be positioned in parallel with the voltage divider.

14. The cooling apparatus of claim 13, wherein the switch is comprised of an open collector gate, P-channel MOSFET.

15. The cooling apparatus of claim 14, wherein the fan is a two wire DC fan that operates at a speed that is substantially proportional to the input voltage received by the fan.

16. A cooling apparatus for a computer comprising:

a first voltage source providing a first voltage;

a reference voltage source providing a reference voltage;

a fan having a first input and a second input which are adapted to be mounted in a computer wherein the fan operates at a speed that is substantially proportional to the voltage that is applied between the first and the second inputs on the fan;

a zener diode voltage divider connected to the first voltage source and to the first input of the fan wherein the second input of the fan is connected to the reference voltage source; and a switch connected to the first input of the fan and to the first voltage source so as to be connected in parallel with the zener diode voltage divider so that when the switch is closed, the switch directly applies the first voltage to the first input of the fan and when the switch is open, the first input of the fan receives a second voltage that is less than the first voltage from the zener diode voltage divider such that the speed of operation of the fan upon receiving the second voltage is less than the speed of operation of the fan receiving the first voltage, wherein the fan receives only one of the first and second voltages in the first and second positions of the switch.

17. The cooling apparatus of claim 16, wherein the first voltage is approximately 12 volts DC, the reference voltage is approximately 0 volts DC and the change in magnitude between the first voltage and the second voltage is approximately 3 volts DC.

18. The cooling apparatus of claim 17, wherein the switch is comprised of an open collector gate, P-channel MOSFET that is connected in series between the first voltage source and the first input of the fan so as to be positioned in parallel with the voltage divider.

19. The cooling apparatus of claim 18, wherein the fan is a two wire DC fan.

* * * * *